UNITED STATES PATENT OFFICE.

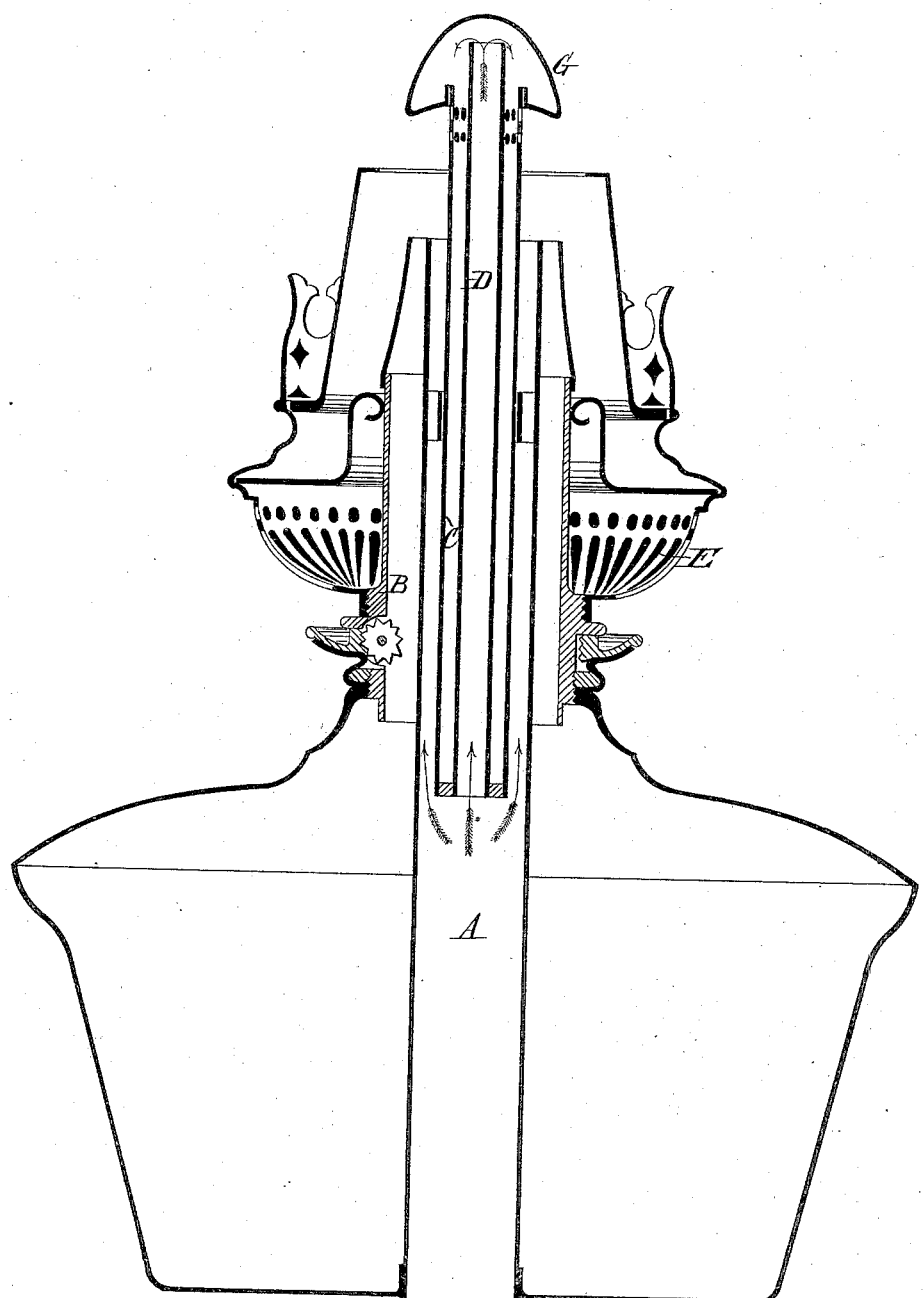

ALBERT M. SILBER, OF LONDON, ENGLAND.

OIL-LAMP.

SPECIFICATION forming part of Letters Patent No. 371,795, dated October 18, 1887.

Application filed February 23, 1887. Serial No. 228,589. (No model.) Patented in England January 15, 1887, No. 685.

*To all whom it may concern:*

Be it known that I, ALBERT MARCIUS SILBER, a citizen of England, residing at Wood street, Cheapside, in the city of London, England, have invented a new and useful Improvement in Oil-Lamps, of which the following is a specification.

This invention has for its object to provide a novel Argand burner whereby the brilliancy of the flame is increased; and to such end the invention consists in the combination of devices, hereinfter described and claimed, reference being made to the accompanying drawing, in which the figure is a vertical sectional view of an Argand burner embodying my invention.

In the accompanying drawing, A is the central air-tube, forming the inner lining of the annular space B, occupied by the wick. Within the tube A, I fix two concentric tubes, C and D. The interior of the tube A is thus divided into several concentric spaces. First, there is the annular space between A and C, which is a channel by which a portion of the air ascends to supply the interior of the flame; secondly, there is the annular space between C and D, which is closed at the bottom, so that no air ascends by it; thirdly, there is the central space of the tube D, which, as shown, is open at the bottom. The tube D extends up into a hollow central deflector, G, which is fixed on the top of the tube C, and immediately under the base of the deflector G there are a number of perforations through the wall of the tube C. The air that ascends by the tube D rises into the interior of the deflector G, and, becoming heated therein, it descends through the annular passage between C and D at the base of the deflector and issues through the perforations of C, being thus directed against the interior of the flame, where it promotes intense combustion and consequent brilliancy of light.

I am aware that the central air-channel of an Argand lamp has been subdivided by concentric tubes for the purpose of equalizing the air-supply and steadying the flame; also, that a solid central deflector has been employed to direct the air against the interior of the wick; but the central tube has not, so far as I know, been connected to a hollow deflector heated by the flame, so as to heat a portion of the air-supply, and thereby enhance the brilliancy of the flame.

Having thus described the nature of my invention and the best means I know for carrying it into practical effect, I claim—

The combination, with an Argand burner, of the central air-supply tube, A, the concentric tubes C D, of unequal length, located in the upper part of said air-supply tube, the outer shorter tube, C, being provided at its upper end with perforations, and the hollow deflector G, mounted on the upper end of the tube C and communicating with the tubes C D, substantially as shown and described.

In testimony whereof I have signed my name to this specification, in the presence of two subscribing witnesses, this 11th day of February, A. D. 1887.

A. M. SILBER.

Witnesses:
OLIVER IMRAY,
*Patent Agent, 28 Southampton Buildings, London, W. C.*
WALTER J. SKERTEN,
*17 Gracechurch Street, London, E. C.*